United States Patent [19]
French

[11] Patent Number: 4,465,059
[45] Date of Patent: Aug. 14, 1984

[54] HOT WATER HEATING SYSTEM

[76] Inventor: Roger F. French, P.O. Box 158, Jackson, N.H. 03846

[21] Appl. No.: 303,468

[22] Filed: Sep. 18, 1981

[51] Int. Cl.³ .............................................. F24J 3/02
[52] U.S. Cl. .................................. 126/433; 126/435
[58] Field of Search ............... 126/435, 432, 422, 427, 126/900, 362, 420, 421, 433; 165/127; 122/406 R; 237/8 B, 8 A, 8 R, 59, 61; 219/282, 297, 314, 325, 378

[56] References Cited

U.S. PATENT DOCUMENTS

| | | | |
|---|---|---|---|
| 2,176,539 | 10/1939 | Moore | 126/362 |
| 2,190,832 | 2/1940 | Moore | 126/362 X |
| 4,130,110 | 12/1978 | Bottum | 126/435 X |
| 4,257,479 | 3/1981 | Newton | 126/435 X |
| 4,273,102 | 6/1981 | Anthony | 126/435 |
| 4,296,729 | 10/1981 | Cooper | 126/421 |
| 4,309,982 | 1/1982 | Oquidam | 126/435 X |
| 4,326,499 | 4/1982 | Koskela | 126/435 X |

*Primary Examiner*—Samuel Scott
*Assistant Examiner*—Randall L. Green
*Attorney, Agent, or Firm*—W. R. Hulbert

[57] ABSTRACT

A solar hot water heating system has a primary tank heated by solar energy utilizing a heat transfer medium circulated between a solar collector and a heat exchanger located in the primary tank. Usually a back-up tank is provided to supplement the solar system. The primary tank receives cold water from a pressurized source. Its hot water outlet is connected to a heating and storage back-up tank the outlet of which supplies hot water to a domestic water supply, or the like. A pressure-actuated valve responds to a condition of the medium. When a predetermined temperature is reached the valve opens to release water from the system thereby permitting surplus hot water from the primary tank to replace the released water and thus reduce back-up energy requirement.

1 Claim, 1 Drawing Figure

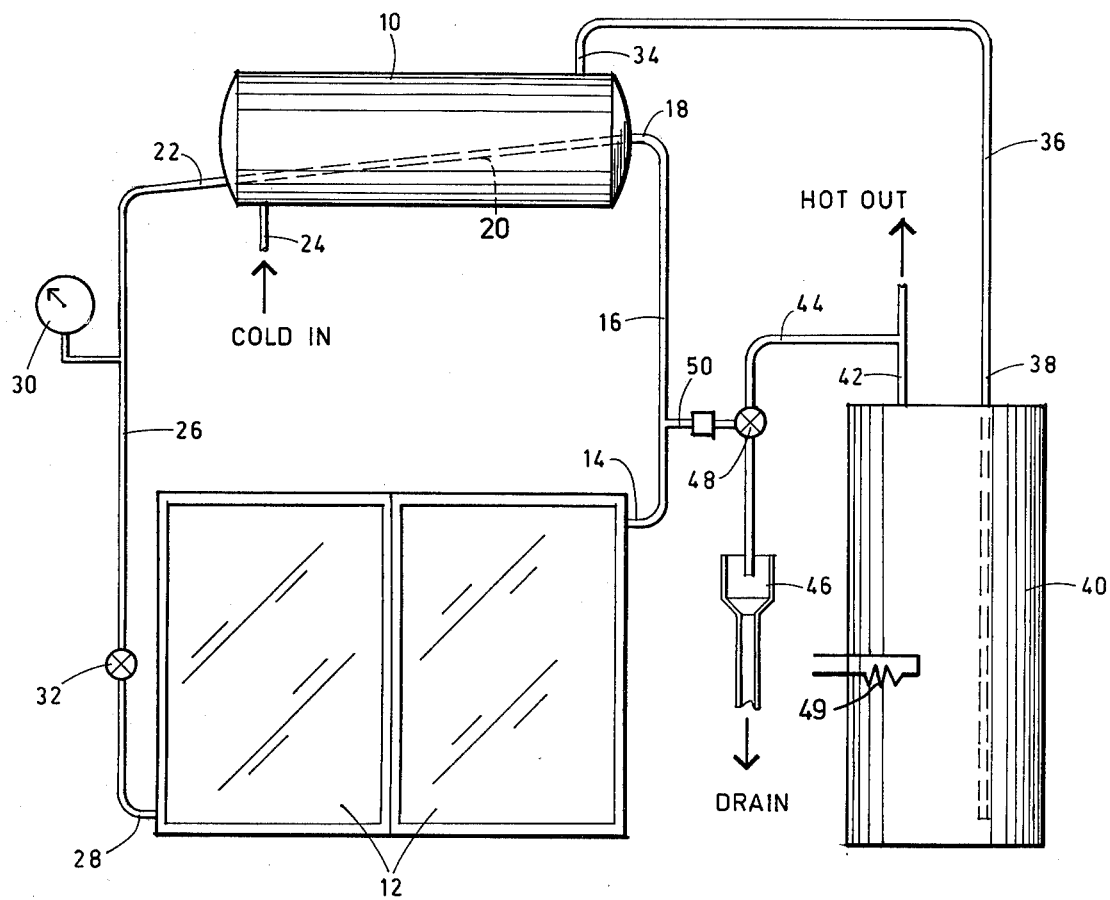

HOT WATER HEATING SYSTEM

BACKGROUND OF THE INVENTION

This invention relates to solar hot water heating systems of the general type shown in Bottum U.S. Pat. No. 4,120,289 and is closely related to the invention described in allowed application Ser. No. 118,486, filed Feb. 4, 1980, now U.S. Pat. No. 4,296,729 by George H. Cooper, the disclosures of which are hereby incorporated by reference.

In solar hot water heating systems which employ a circulating heat transfer medium, which may be a phase-change medium, heated in the collector and cooled in a heat exchanger, giving up its heat to water in a water heating tank, and then returned to the collector, there is often produced more hot water than can be conveniently used or stored at the time. Such systems are often installed in existing homes which already have a hot water heating tank heated by electricity or some other means.

Furthermore, in those systems which employ a phase change heat transfer medium which evaporates in the collector and condenses to liquid form in the heat exchanger, it is desirable that the solar collector, in order to prolong its life, not be permitted to stagnate without the circulation of the medium. Such stagnation will occur if the heat transfer circulating system shuts down because of overheating. Such shut down can occur due to the operation of a pressure or temperature actuated valve, such as shown in Bottum U.S. Pat. No. 4,203,422, which operates to prevent overheating the medium.

An object of the invention is to provide means for cooling the system by releasing hot water from the water heating tank and replacing it with cold water thereby preventing overheating of the heat transfer medium and corresponding stagnation of the collecting panels.

Another object of the invention is to permit utilization of the surplus hot water thus generated in the solar heating tank by feeding it to an existing back-up hot water heating tank displacing water released therefrom.

A still further object is to provide such a system which is operated by the pressure of a circulating phase-change medium without any requirement for external power, pumps or the like.

SUMMARY OF THE INVENTION

In accordance with the invention there is provided in a hot water heating system adapted to receive cold water from a pressurized source and to supply hot water for domestic use, or the like, which hot water heating system is of the type employing a heat transfer medium circulated through a heat collector exposed to a source of heat, and thence through a heat exchanger installed in a primary storage and heating tank where it gives up its heat to the water and then through a return line back to the collector, thereby forming a closed circuit and wherein the water heating and storage tank has a lower inlet to receive cold water from a pressurized source and an upper hot water outlet, the following improvement:

Automatic valve means are provided in communication with said closed circuit and adapted to open and close responsive to predetermined conditions of said medium, such as pressure or temperature, for controlling the release of water from said tank in accordance with said conditions, whereby surplus hot water from said primary tank will be released therefrom and replaced by cold water from said source. Preferably, said automatic valve means comprises a pressure operated valve actuated solely by the pressure of said medium.

In a preferred embodiment of the invention there is provided a back-up water heating and storage tank having an outlet for supplying hot water for domestic use, and a conduit communicating between the hot water outlet of the primary tank and the back-up tank, said automatic valve means controlling the release of water in accordance with such conditions from the back-up tank, whereby surplus hot water from the primary tank will be forced by the pressure of the source to pass through the conduit into the back-up tank to replace the released water.

Still further objects, features and advantages of the invention will become apparent from the following detailed description of a preferred embodiment, taken in conjunction with the accompanying drawing.

BRIEF DESCRIPTION OF DRAWING

The sole FIGURE of the drawing is a somewhat diagrammatic representation of a complete system employing a phase-change heat transfer medium embodying the invention.

DETAILED DESCRIPTION OF PREFERRED EMBODIMENT

In the drawing a primary hot water heating and storage tank is indicated by the numeral 10. In the usual case it will be mounted in the rafters in attic space in a dwelling. Arranged for exposure to the sun are one or more solar collectors 12 which are charged with a phase-change, heat transfer medium such as the well-known refrigerant, Freon 114, and, typically will be mounted on the building's roof at a level below that of tank 10. The outlet 14 of the collector is connected by conduit 16 to inlet 18 to heat exchanger 20 in tank 10. Thus, phase-change medium evaporated in the collectors by the sun's rays, passes from the outlet 14 through the inlet 18 into heat exchanger tubes 20 which are mounted within the tank 10 and which slope downwardly from inlet 18 to outlet 22.

The tank 10 has its cold water inlet 24 arranged to be connected to a source of water under pressure, such as a city main.

Condensed refrigerant (phase-change medium) flows by gravity from outlet 22 through conduit 26 to inlet 28 at the bottom of solar collectors 12. In communication with conduit 26 is a pressure gauge 30 to display the pressure of the refrigerant. Also mounted in conduit 26 is a pressure or temperature sensitive valve 32. Reference may be had to Bottum U.S. Pat. No. 4,120,289 or 4,203,422 for the purpose and function of this valve. Suffice it to say, it shuts down the system at a predetermined pressure to prevent overheating, permitting condensed refrigerant to be stored in the heat exchanger until the overheated condition abates.

In order to utilize surplus hot water generated in tank 10 its hot water outlet 34 is connected by conduit 36 to cold water inlet 38 of back-up hot water heating and storage tank 40. This back-up tank, in the usual case, is the existing electrically heated hot water tank (heated by electrical heating element 49) in a domestic hot water system and may be located in the basement of the dwelling. The hot water outlet 42 of tank 40 is adapted to deliver hot water to domestic hot water system of the building.

Further in accordance with the invention, the outlet 42 is connected by drain line 44 to a drain 46. In the line 42 is inserted a pressure actuated valve 48 which is placed in communication through conduit 50 with the hot side of the refrigerant circulating system by connection to conduit 16. A suitable modulating water regulating valve for this purpose is one of series V46, V47, 247 manufactured by Penn Division, Johnson Controls, Inc., 1302 E. Monroe St., Goshen, IN 46526.

The automatic valve 48 may be set to open when it senses a predetermined pressure in the conduit 16 e.g. 75 psig (equivalent of 145° F.) indicating that all the water in tank 10 has been heated to the predetermined temperature of 145° F. At this point the valve 48 starts to open releasing water from tank 40. This causes hot water from tank 10 to be fed into tank 40, replacing the released water, while cold water enters tank 10 through inlet 24. The valve 48 will only transfer enough water to maintain optimum conditions.

Since the collection of energy continues, the collectors do not stagnate, thus their lifetime is extended. Should the water system fail (i.e. power failure) the water transfer would cease and the sun would further raise the temperature of the water and that of the solar loop. When it reaches 155° F. (pressure 88 psig) the pressure limiter valve 32 closes and the liquid refrigerant backs up in the heat exchanger 10 and depletes that in the collectors 12. Thus heat transfer ceases and the collectors stagnate. This back up would then protect the system.

It will be seen that there has been provided a system of utilizing surplus hot water generated in the solar hot water system by feeding it into existing hot water heating and storage back-up tank 40 thereby substantially increasing the overall hot water storage capacity of the system, lengthening the life of the collectors, decreasing the amount of supplemental electric heat and increasing overall efficiency.

It will be understood, of course, that whenever a hot water faucet in the domestic hot water system is opened, hot water will be drained from tank 40 and will be replaced by water from tank 10. Therefore, when hot water is being utilized in the dwelling the temperature in tank 10 will be tempered by the entry of cold water from inlet 24 and the valve 48 will not be actuated. The invention contemplates that water will be released from tank 40 to the drain 46 only under conditions when there is surplus hot water available from the tank 10.

While there is herein disclosed and described a preferred embodiment of the invention it will nevertheless be understood that it is intended that the scope of the invention be limited only by the proper interpretation to be afforded the appended claims.

I claim:

1. In a domestic hot water heating system for a building adapted to be connected to a source of cold water under pressure, the system having a primary water heating and storage tank heated by solar means and a secondary back-up water heating and storage tank heated by conventional means, the solar heating means comprising a solar collector located at a level below that of the primary tank, a heat exchanger within the primary tank and conduit means connecting the outlet of the collector to the inlet of the heat exchanger and the outlet of the heat exchanger to the inlet of the collector to provide a closed system adapted to be charged with a phase change medium evaporated and circulated solely by solar heat in gaseous form from the collector to the heat exchanger and returned in liquid form by gravity from the heat exchanger to the collector there to be reheated and circulated as before, the improvement permitting surplus hot water to be transfered from the primary tank to the secondary tank without the use of external power sources, comprising a cold water inlet for admitting water from said pressurized source to said primary tank, a conduit for conducting hot water from said primary tank to said backup tank, a water discharge conduit communicating with the interior of said back-up tank for releasing water therefrom, a pressure-actuated valve in said water discharge conduit, and a conduit placing said valve in communication with the gaseous side of said closed system, whereby, when the phase-change medium therein reaches a predetermined pressure said valve will open, whereby water is forced from said back-up tank and replaced by hot water from said primary tank solely by the flow into said primary tank of cold water from said pressurized source.

* * * * *

UNITED STATES PATENT AND TRADEMARK OFFICE
CERTIFICATE OF CORRECTION

PATENT NO. : 4,465,059
DATED     : August 14, 1984
INVENTOR(S) : Roger F. French It is certified that error appears in the above-identified patent and that said Letters Patent are hereby corrected as shown below:

On the title page:

The second Reference cited reading 2,190,832 Moore should be corrected to read, 2,190,382 Moore

Col. 3, line 29, please change "10" to "20"

Signed and Sealed this

Eighth Day of January 1985

[SEAL]

Attest:

Attesting Officer

GERALD J. MOSSINGHOFF

*Commissioner of Patents and Trademarks*